(12) United States Patent
Fugel et al.

(10) Patent No.: US 8,690,452 B2
(45) Date of Patent: Apr. 8, 2014

(54) CAGE FOR ROLLER BODIES

(75) Inventors: Wolfgang Fugel, Nuremberg (DE); Alexander Reimchen, Herzogenaurach (DE)

(73) Assignee: Schaeffler Technologies AG & Co., KG, Herzogenaurach (DE)

( * ) Notice: Subject to any disclaimer, the term of this patent is extended or adjusted under 35 U.S.C. 154(b) by 371 days.

(21) Appl. No.: 12/812,352

(22) PCT Filed: Nov. 10, 2008

(86) PCT No.: PCT/EP2008/065204
§ 371 (c)(1),
(2), (4) Date: Jul. 9, 2010

(87) PCT Pub. No.: WO2009/086964
PCT Pub. Date: Jul. 16, 2009

(65) Prior Publication Data
US 2010/0278473 A1      Nov. 4, 2010

(30) Foreign Application Priority Data

Jan. 11, 2008   (DE) .......................... 10 2008 004 033

(51) Int. Cl.
*F16C 33/46*   (2006.01)

(52) U.S. Cl.
USPC ........................................................ 384/623

(58) Field of Classification Search
USPC .................. 384/609, 614, 618, 623, 523, 533
See application file for complete search history.

(56) References Cited

U.S. PATENT DOCUMENTS

| 1,232,523 | A | * | 7/1917 | Folk ............................... 384/580 |
| 3,240,542 | A | * | 3/1966 | Jahn ............................... 384/623 |
| 3,306,685 | A | * | 2/1967 | Bixby ............................ 384/533 |
| 5,938,349 | A | * | 8/1999 | Ogawa .......................... 384/615 |
| 6,421,917 | B1 | | 7/2002 | Muentnich et al. |
| 2005/0105839 | A1 | * | 5/2005 | Chin-Pei et al. .............. 384/523 |
| 2007/0206894 | A1 | * | 9/2007 | Kotani et al. ................. 384/623 |

FOREIGN PATENT DOCUMENTS

| DE | 212 758 C | 8/1909 |
| DE | 279 476 C | 10/1914 |
| DE | 1 840 219 | 10/1961 |
| DE | 198 12 252 A1 | 9/1999 |
| DE | 10 2006 015 547 | 10/2006 |
| EP | 1 818 555 A1 | 8/2007 |
| JP | 2000213546 A | 8/2000 |
| JP | 2004 211 824 A | 7/2004 |

* cited by examiner

*Primary Examiner* — Alan B Waits
*Assistant Examiner* — Brian McGovern
(74) *Attorney, Agent, or Firm* — Lucas & Mercanti, LLP

(57) ABSTRACT

A cage for roller bodies, for example axial bearings or flat guides, which is approximately W-shaped in the longitudinal cross-section, having side walls forming W-shaped limbs and webs connecting them, between which the roller bodies are accommodated. The profile of the webs is suitable for limiting the freedom of movement of the roller bodies to at least two degrees of freedom. Furthermore, the profile of the webs is designed such that the freedom of movement of the roller bodies can be limited in at least one additional degree of freedom.

8 Claims, 4 Drawing Sheets

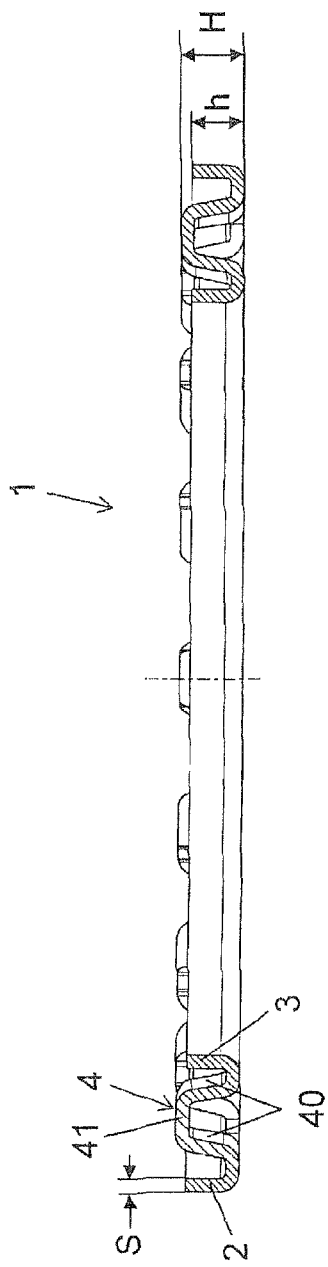
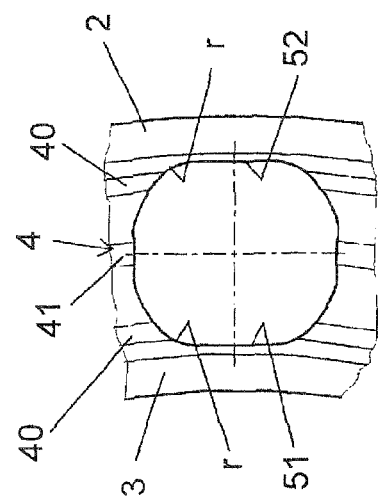

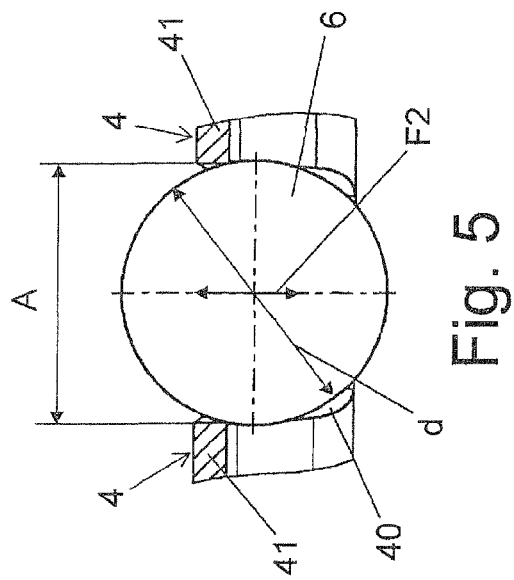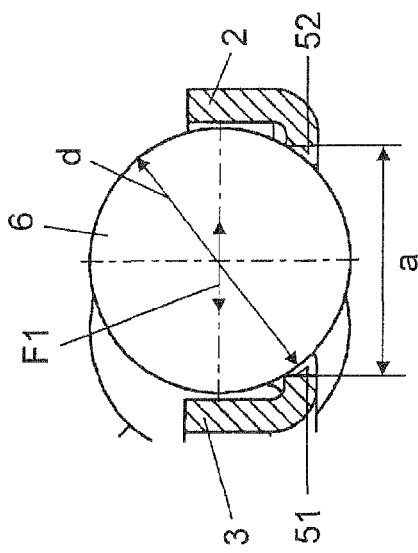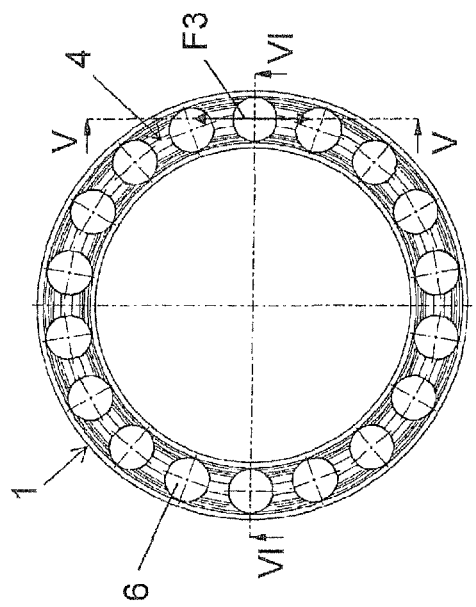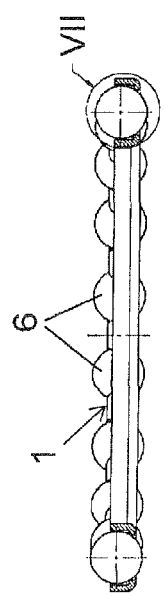

CAGE FOR ROLLER BODIES

This application is a 371 of PCT/EP2008/065204 filed Nov. 10, 2008, which in turn claims the priority of DE 10 2008 004 033.9 filed Jan. 11, 2008, the priority of both applications is hereby claimed and both applications are incorporated by reference herein.

FIELD OF THE INVENTION

The invention relates to a cage for rolling bodies, for example for axial bearings or flat guides, wherein the cage has an approximately W-shaped configuration in the longitudinal section, with side walls forming legs of the W and webs connecting the side walls, wherein the rolling bodies are received between the webs, wherein the profile of the webs is suitable for limiting the freedom of movement of the rolling bodies in at least two degrees of freedom.

BACKGROUND OF THE INVENTION

As is well known, cages for rolling bodies have the purpose of securely guiding the rolling bodies between the rolling body races and to keep the rolling bodies at a distance from each other. It is only in this manner that a uniform load distribution is facilitated, a mutual interference of the rolling bodies is prevented and, thus, a proper function of the roller bearing is ensured. In addition, the expert desires to accommodate as many rolling bodies as possible in the roller bearing in a compact manner, so that roller bearings for the highest demands can be made available through a high density of the rolling bodies. However, this makes it necessary to provide the corresponding numbers of pockets or free spaces in the roller bearing cage and, in turn, leads to a structural weakening of the cage. This results in an insufficient stiffness and an increased danger of a mechanical failure of the cage during operation.

In the field of needle thrust bearings, bearings which are W-shaped or Sigma-shaped in cross-section have been found useful in this connection. As a rule, these cages are constructed as a single piece and have a relatively high stiffness with a higher achievable roller body density.

A cage for rolling bodies of this type is known from DE 1 840 219 U. In that case, the cage is constructed for cylindrical rolling bodies and has webs with a specially configured profile, such that the web sections extending parallel to the horizontal divisional plane of the rolling bodies have a greater width than the web sections extending transversely thereto, and the guidance of the rolling bodies is therefore exclusively carried out by the web sections which extend parallel to the divisional plane of the rolling bodies. The profile of the webs is suitable for limiting the freedom of mobility of the rolling bodies in two degrees of freedom (to even almost fix the rolling bodies in these degrees of freedom), namely in the circumferential direction as well as in the axial direction of the cage.

In the case of a mechanical failure of the cage (rupture of one of the side walls), which is usually caused by external influences, an "overrolling" by the rolling bodies in the area of the damaged cage may occur, i.e., the rolling bodies leave their race or functional diameter in the radial direction. This leads to a local weakening of the load bearing capacity of the bearing and may possibly cause further damage.

A cage made of synthetic material in a single piece for ball-shaped rolling bodies is described in DE 10 2006 015 547 A1, wherein projections protruding axially towards the cage produce cell-like chambers for the individual rolling bodies and, thus, it is ensured that the rolling bodies are spaced apart from each other in the circumferential direction. An assembly of rolling bodies at the cage takes place partially by widening in the manner of clips directly spaced-apart projections which are shaped especially for this purpose. The diameter of the cell-like chambers is dimensioned in such a way that a significant play is made possible for the rolling bodies in order to be able to change their position relative to the chambers in the radial and in the circumferential directions.

OBJECT OF THE INVENTION

The invention is based on the object of further developing a cage of the generic type for a roller bearing in such a way that the guidance of the rolling bodies is improved as compared to known solutions.

SUMMARY OF THE INVENTION

The invention is based in the recognition that through a suitable selection of the web profile of the cage, the guidance properties of the cage can be significantly improved.

In accordance with the features of the main claim, the invention starts from a cage for rolling bodies, for example, for thrust bearings or flat guides, which is configured approximately W-shaped in the longitudinal section, with side walls forming W-legs and with webs connecting the side walls, wherein the rolling bodies are received between the webs, and wherein the profile of the webs is suitable for limiting the degree of freedom of the rolling bodies in at least two degrees of freedom. In this roller bearing cage, it is additionally provided in accordance with the invention that the profile of the webs is constructed in such a way that the freedom of movement of the rolling bodies can be limited in at least one additional degree of freedom. As a result of this configuration, it is made possible that the guidance of the rolling bodies is significantly improved.

The dependent claims describe preferred further developments or embodiments of the invention.

In accordance with a first further development it is provided that the degree of freedom of the rolling bodies is limited by the profile of the webs in axial, tangential and radial direction of the cage. This significantly reduces the danger of overrolling of cage parts by the rolling bodies in the case of damage. Consequently, the rolling bodies are, just by their webs, always held at their functional diameter or at the rolling body races of the bearing parts.

In accordance with a second advantageous further development of the invention, the webs have web sections which extend obliquely starting from the side walls, and that the limitation of the freedom of movement of the rolling bodies in the radial direction is effected by guide surfaces which are assigned to the obliquely extending web sections. It is to be considered extremely advantageous if at each side of a web facing a rolling body, the guide surfaces include an angle with each other that is smaller than 180°. As a result, the radial guidance of the rolling bodies is made possible with simple means while maintaining the W- or Sigma-profile.

It is very advantageous if the obliquely extending web sections merge in an approximately horizontally extending web section, wherein the horizontally extending web section of a web forms with the horizontally extending web section of an adjacent web a free distance A which is smaller than the roller body received between the webs. As a result of this measure, a simple clip-like assembly of the rolling bodies into the intermediate spaces located between the webs is possible because during the assembly the rolling body presses on the adjacent webs elastically and when the rolling bodies' functional position has been reached, the webs again resiliently return back into their initial position.

In accordance with an advantageous feature, it may be provided that the intermediate spaces have sides extending along the side walls, wherein the spacing between the sides is smaller than the rolling body received in the intermediate spaces, so that the support of the rolling bodies is ensured also in the axial direction of the cage in a structurally simple manner.

In accordance with a highly advantageous embodiment of the concept of the invention, the intermediate spaces formed between the webs in the top view have an approximately square contour, wherein the sides thereof merge into each other by means of radii. On the one hand, this facilitates a significant reduction of the notch effect in these areas and, on the other hand, this contributes to the increase of the packing or rolling body density. The packing density, however, can also be increased by reducing the web width.

If advantageously the webs have a height H which is greater than a height h provided for the side walls, the stability of the cage can be positively influenced. In addition, by the height of the webs, the axial freedom of movement of the rolling bodies can be influenced.

A structural roller bearing unit should have advantageously at least one cage according to the present invention, in order to improve the functional safety of the structural roller bearing unit.

BRIEF DESCRIPTION OF THE DRAWINGS

The invention is in the following explained in more detail with the aid of preferred embodiments with the aid of the enclosed drawing.

In the drawing:

FIG. 2 is a section view according to section line II-II of FIG. 1;

FIG. 3 is a detailed view of FIG. 1 in the top view;

FIG. 4 is a top view of a according to the invention with mounted rolling bodies;

FIG. 5 is a sectional view according to section line V-V of FIG. 4;

FIG. 6 is a sectional view along section line VI-IV of FIG. 4;

FIG. 7 is a detailed view VII of FIG. 6;

DETAILED DESCRIPTION OF THE DRAWINGS

Figure 1:
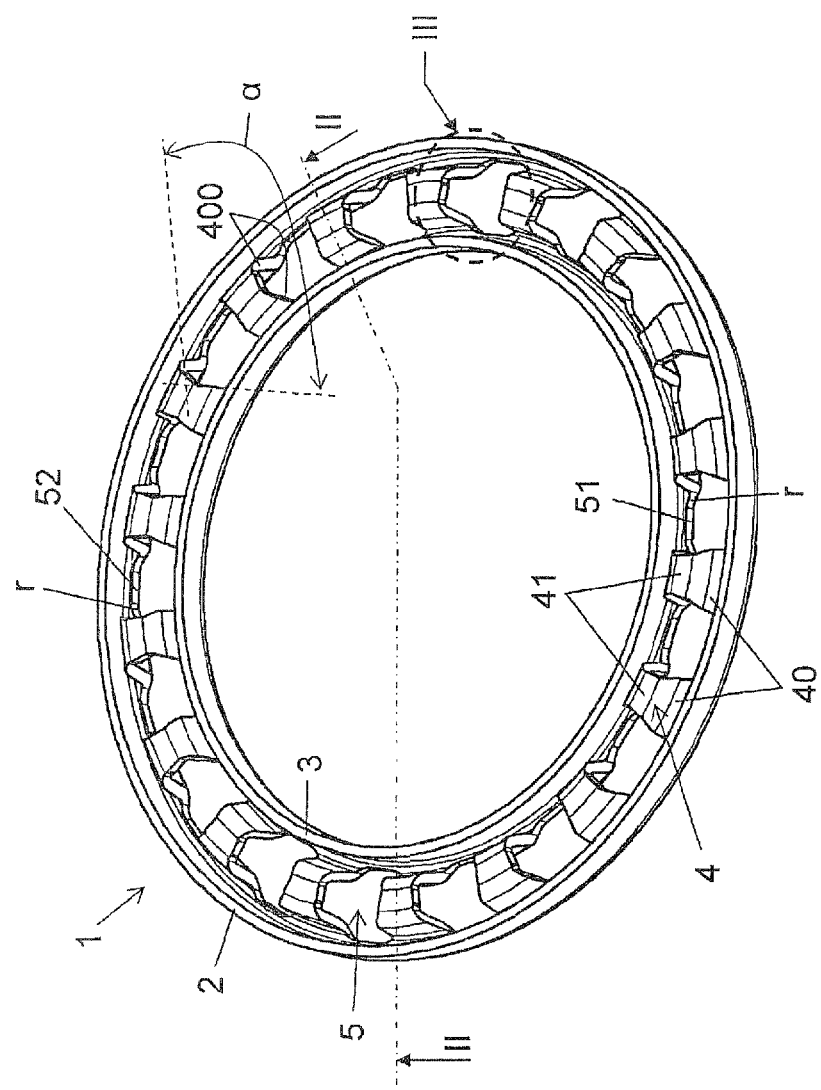
FIG. 1 Shows a first embodiment of a cage according to the invention in a perspective view.

Initially, reference is made to FIGS. 1 through 3. The Figures show a first preferred embodiment for a cage 1 according to the invention in different views. The cage 1 has a radially outer side wall 2 and a radially inner side wall 3, wherein the side walls 3 are connected to each other by webs 4. The webs 4 are arranged distributed in uniform spacings over the circumference of the cage 1 and form intermediate spaces 5 between adjacent webs 4 in which rolling bodies 6 can be mounted, which is seen particularly well in FIGS. 4 through 9. Starting from the side walls 2, 3, the webs 4 have initially obliquely upwardly or axially outward extending outer web sections 40 which merge in an approximately horizontally extending oblique section 41 which has a height H (FIG. 2). The side walls 2 and 3, on the other hand, each have a height h. The obliquely extending web sections 40 have on their sides facing the mounted roller bodies 6 guide surfaces 400 for the rolling bodies 6 and include an angle $\alpha < 180°$ with each other.

As particularly shown in FIG. 3, the intermediate spaces 5 have in the top view approximately the shape of a square with significantly rounded corners and with two parallel sides 51, 52 which extend along the side walls 2, 3, wherein these sides 51, 52 are connected to the webs 4 via radii r.

The cage 1 is preferably constructed in one piece of drawn and punched steel sheet. The thickness s of the sheet steel (see FIG. 2) can be adjusted accordingly depending on the ball diameter of the rolling body 6 and the function of the structural unit. In a cage-guided function, the rolling body 6 should protrude only slightly or not at all relative to the axially flat side of the cage 1. In this cage, a comparatively thick steel sheet (ratio steel thickness/roller body diameter=30%) can be selected. In the case of a rolling body-guided function, a reduced thickness of the steel sheet (ratio steel sheet/rolling body diameter=about 25%) is suitable.

In FIGS. 4 to 8, which will be referred to in the following, the cage according to the invention is illustrated with mounted rolling bodies 6. The rolling bodies are spherically shaped and have a diameter d. However, the rolling bodies could also have different shapes, for example, they may be cylindrical. This would make necessary a corresponding structural adaptation of the cage 1. It can be seen that the sides 51 and 52 extending along the side walls 3, 2 have a distance a from each other which is smaller than the diameter d of the rolling bodies 6. Moreover, it can be seen that the horizontally extending web section 41 of a web 4 forms, together with the horizontally extending web section 41 of an adjacent web 4, always a free distance A which is smaller than the diameter d of the rolling bodies 6 received between the webs 4. As a result of the above-described configuration of the cage 1, it is possible to limit the freedom of movement of the rolling bodies 6 in three degrees of freedom, namely, in a first degree of freedom F1 extending radially relative to the cage 1, a second degree of freedom F2 extending axially relative to the cage 1, and a third degree of freedom F3 extending tangentially relative to the cage 1 (see FIGS. 4, 5 and 7).

Figure 9:
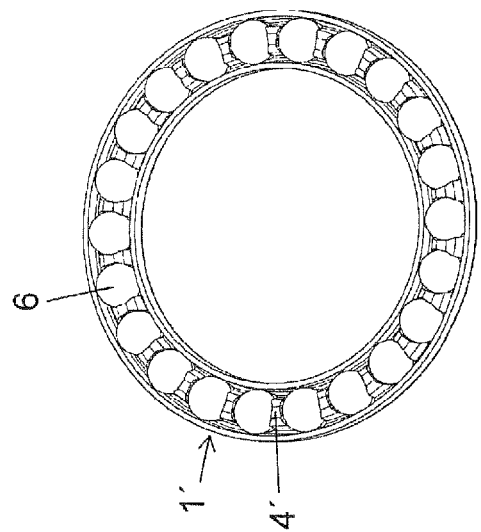
FIG. 9 shows a single embodiment of the cage according to the invention in a perspective view with mounted rolling bodies.
Figure 8:
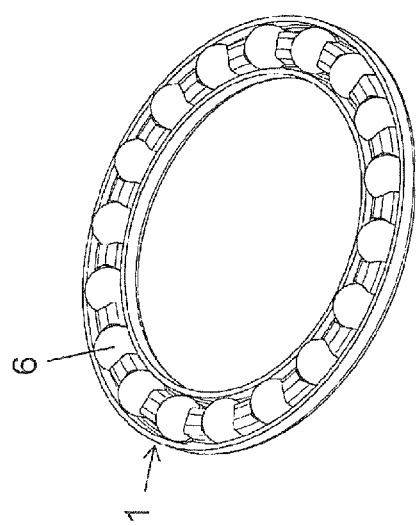
FIG. 8 shows the cage according to FIG. 1 in a perspective view with mounted rolling bodies.

Finally, a second embodiment of a cage 1' according to the invention is illustrated in FIG. 9, in which in contrast to the cage 1 of FIG. 8, the cage 1' has narrower webs 4'. This makes it possible to increase the packing density of the cage 1 with rolling bodies 6 and, as a result, a higher load bearing capacity of a roller bearing constructed in this manner.

LIST OF REFERENCE NUMERALS 1, 1' Cage
2 Radially outer side wall of the cage
3 Radially inner side wall of the cage
4, 4' Web
40 Obliquely extending web section
400 Guide surface of the obliquely extending web section
41 Horizontally extending web section
5 Intermediate space between two adjacent webs
51 Side of an intermediate space extending along the side walls
52 Side of an intermediate space extending along the side walls
6 Rolling body
a Distance between the sides of the intermediate space extending along the side walls A Distance between adjacent horizontal web sections
d Diameter of the rolling bodies
F1 Degree of freedom in radial direction of the cage, in which the freedom of Mobility of the rolling bodies is limited
F2 Degree of freedom in axial direction of the cage, in which the freedom of mobility of the rolling bodies is limited
F3 Degree of freedom in tangential direction of the cage, in which the freedom of movement of the rolling bodies is limited
h Height of side walls
H Height of the webs
r Radii through which the sides extending along the side walls are connected to the webs
s Thickness of the cage material
α Angle included by the guide surfaces with each other

The invention claimed is:

1. A cage for rolling bodies, comprising:
side walls including a radially inner side wall and a radially outer side wall, the side walls extending circumferentially, and
webs connecting the side walls, a longitudinal section through one of the webs and side walls having an approximately W-shaped configuration with the side walls forming outer legs of the W-shaped configuration, wherein the rolling bodies are received between the webs, wherein a profile of the webs is suitable for limiting freedom of movement of the rolling bodes in at least three degrees of freedom,
wherein an intermediate space is formed between confrontingly opposed sides of each adjacent pair of the webs, wherein the intermediate space extends circumferentially from one of the confrontingly opposed sides to the other, and extends radially from a radially innermost end to a radially outermost end, the radially innermost end and the radially outermost end formed by sides that extend along the side walls between the confrontingiy opposed sides, wherein a spacing (a) in a radial direction between the radially innermost end and radially outermost end of each of the intermediate spaces is smaller than a dimension of the rolling bodies in the radial direction, wherein guide surfaces formed in obliquely extending web sections of the web and configured to contact the rolling bodies, the guide surfaces form an angle (α) with each other which is smaller than 180°.

2. The cage according to claim 1, wherein the freedom of movement of the rolling bodies is limited by the profile of the webs in an axial direction (F2), in a tangential direction (F3) and in a radial direction (F1) of the cage.

3. The cage according to claim 1, the limitation of the freedom of movement of the rolling bodies in a radial direction is effected by the guide surfaces assigned to the obliquely extending web sections.

4. The cage according to claim 3, wherein in each of the webs the obliquely extending web sections merge into a horizontal web section extending approximately horizontally, wherein the horizontal web section of the each of the webs forms with the horizontal web section of an adjacent one of the webs a free distance (A) which is smaller than the rolling bodies received between the webs.

5. The cage according to claim 1, wherein the intermediate spaces have in a top view an approximately square contour formed by the radially innermost end, the radially outermost end, and the confrontingly opposed sides of the two adjacent ones of the webs, wherein the radially innermost end and the radially outermost end merge into the confrontingly opposed sides by means of radii (r).

6. The cage according to claim 1 wherein the webs have a height (H) which is greater than a height (h) assigned to the side walls.

7. A structural roller bearing unit with at least one cage according to claim 1.

8. The cage according to claim 1, wherein the profile of the webs is configured to receive spherically shaped roller bodies between the webs.

* * * * *